(12) United States Patent
Uchida

(10) Patent No.: US 6,831,920 B1
(45) Date of Patent: Dec. 14, 2004

(54) MEMORY VACANCY MANAGEMENT APPARATUS AND LINE INTERFACE UNIT

(75) Inventor: Yoshihiro Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/408,980

(22) Filed: Sep. 29, 1999

(30) Foreign Application Priority Data

Sep. 29, 1998 (JP) .......................................... 10-276028

(51) Int. Cl.[7] .............................................. H04L 12/28
(52) U.S. Cl. ................. 370/399; 370/395.1; 370/236.2
(58) Field of Search ........................... 370/236.1, 236.2, 370/428, 429, 395.1, 398, 399

(56) References Cited

U.S. PATENT DOCUMENTS

| | | | | |
|---|---|---|---|---|
| 5,634,097 A | * | 5/1997 | Ashi et al. ..................... 714/45 |
| 5,673,383 A | * | 9/1997 | Sukegawa ...................... 714/8 |
| 5,799,003 A | * | 8/1998 | Fujimaki et al. ......... 370/241.1 |
| 5,974,045 A | * | 10/1999 | Ohkura et al. ........... 370/241.1 |
| 6,167,047 A | * | 12/2000 | Welfeld ...................... 370/389 |

FOREIGN PATENT DOCUMENTS

| | | |
|---|---|---|
| JP | 54-113224 | 9/1979 |
| JP | 7-321795 | 12/1995 |

* cited by examiner

Primary Examiner—Alpus H. Hsu
Assistant Examiner—Thien Tran
(74) Attorney, Agent, or Firm—Katten Muchin Zavis Rosenman

(57) ABSTRACT

A memory vacancy management apparatus for managing vacant addresses of a memory which is capable of storing various information, includes a vacant address management table having a number of addresses identical to a number of addresses of the memory, and storing vacancy information indicating whether or not the addresses of the memory are vacant. The vacancy information with respect to an address of the memory having an arbitrary address value is stored at an address of the vacant address management table having the same arbitrary address value.

7 Claims, 11 Drawing Sheets

MEMORY VACANCY MANAGEMENT APPARATUS AND LINE INTERFACE UNIT

BACKGROUND OF THE INVENTION

1. Field of the Invention

The present invention generally relates to memory vacancy management apparatuses and line interface units, and more particularly to a memory vacancy management apparatus for managing vacant addresses of a memory and to a line interface unit which uses such a memory vacancy management apparatus.

Usually, memories are used in various kinds of apparatuses and equipments used in the field of communication, typified by switching systems, transmission units and terminal equipments. Such memories have various structures and functions. For example, a RAM coupled to a microprocessor bus may be used for a control unit or signal control. In addition, a memory may be provided in a channel system to process the communication data itself, such as a First-In-First-Out (FIFO) which absorbs a phase error of a clock and an elastic memory.

2. Description of the Related Art

Amongst the above described memories, there is a memory which is provided with a function of searching vacant addresses which are not in use.

FIG. 1 is a system block diagram showing an example of a conventional memory having the vacant address searching function. The memory includes a memory cell part (MCELL) 1, a vacant address management table (VTBL) 2, an access controller (ACTL) 3, and a vacant address searcher (VSCH) 4 which are connected as shown in FIG. 1.

The memory cell part 1 stores external data written therein. The vacant address management table 2 has the same address structure as the memory cell part 1, and contains information which indicates whether or not data are stored at corresponding addresses of the memory cell part 1, that is, whether or not the corresponding addresses of the memory cell part 1 are "in use" or "vacant". The access controller 3 controls access, that is, read and write, with respect to the memory cell part 1. In addition, the access controller 3 controls updating of the contents of the vacant address management table 2. The vacant address searcher 4 searches for a next vacant address to which the writing is possible, based on the contents of the vacant address management table 2. The access controller 3 receives a signal ACADR which indicates the address, a write data WDATA, a write request WREQ, and a read request RREQ, and outputs read data RDATA.

FIG. 2 is a flow chart for explaining the operation of the conventional memory shown in FIG. 1. In FIG. 2, a step initializes the vacant address management table 2 and the memory cell part 1. When the initializing of the vacant address management table 2 and the memory cell part 1 ends, a step S2 decides whether or not an access is made from outside the memory. If the decision result in the step S2 is YES, a step S3 decides whether the access is a read or a write.

If the access is the write, a step S4 decides whether or not the vacant address searcher 4 outputs a signal FULL which indicates that the memory cell part 1 is full. If the decision result in the step S4 is NO, a step S5 writes the write data WDATA into the memory cell part 1 at an address corresponding to a vacant address VADR output from the vacant address searcher 4, and at the same time, sets "in use" in the vacant address management table 2 at the corresponding address.

On the other hand, if the access is the read in the step S3, a step S6 decides whether or not an address ACADR of the memory cell part 1 is in use. If the decision result in the step S6 is YES, a step S7 reads the data written at the address ACADR, and sets "vacant" in the vacant address management table 2 at an address corresponding to the address ACADR.

Next, in a step S8, the vacant address searcher 4 carries out a vacancy search process by making a reference to the vacant address management table 2. A step S9 decides whether or not a vacant address is found. If the decision result in the step S9 is YES, a step S10 sets the vacant address found as the vacant address VADR. On the other hand, if the decision result in the step S9 is NO, a step S11 outputs the signal FULL which indicates that there is no vacant address in the vacant address management table 2.

According to this conventional memory, the vacant address searcher 4 constantly searches for the vacant address within the memory cell part 1, and the vacant address found as a result of the search is notified to the access controller 3. Here, the vacant address refers to the address where no valid data is written in the memory cell part 1 from outside the memory. Accordingly, when an external circuit which uses the memory needs to buffer the data into the memory, it is first necessary to check whether or not the signal FULL is output from the memory. If no signal FULL is output from the memory, the data to be buffered is input to the memory as the write data WDATA, while making the write request WREQ to the memory active.

By the operation described above, the write data WDATA which is to be buffered in the memory is stored at the address of the memory cell part 1 indicated by the vacant address VADR. Hence, the external circuit which uses the memory does not have to be aware of which addresses are vacant. After the write data WDATA is written at the address which is indicated by the vacant address VADR, the address is no longer "vacant", and thus, at the same time as writing the write data WDATA into the memory cell part 1, the access controller 3 writes a flag which indicates "in use" at the corresponding address of the vacant address management table 2. Furthermore, a trigger for starting the search is issued from the access controller 3 to the vacant address searcher 4 in order to search for the new vacant address VADR.

On the other hand, when the access to the memory is the read, the external circuit which uses the memory inputs the signal ACADR to the access controller 3, and then makes the read request RREQ active. As a result, the read data RDATA indicates the content of the memory cell part 1 at the address specified by the signal ACADR. In addition, since the read address of the memory cell part 1 is no longer "in use", the access controller 3 simultaneously writes the flag which indicates "vacant" at the corresponding address of the vacant address management table 2. By updating the vacant address management table 2, the vacancy state of the memory cell part 1 also changes, but it is unnecessary to trigger the start of the search in this case, because it remains unchanged that the vacant address VADR already found by the vacant address searcher 4 is "vacant".

In a case where the signal FULL is output before the read is carried out with respect to the memory, the vacant address VADR does not indicate a valid vacant address, and it is necessary in this case to trigger the start of the search. In this case, it is clear that only the address just read is vacant, there is no need to search for the vacant address, and it is sufficient to simply copy the signal ACADR as the vacant address VADR.

Conventionally, the memory having the vacant address search function is generally realized by a software approach, that is, the entire memory or a part excluding a memory part corresponding to the memory cell part 1 is realized by software. In this case, a microprocessor or the like is used to carry out the vacant address search operation of the vacant address searcher 4. FIG. 3 is a diagram showing the construction of the memory using a microprocessor. In FIG. 3, those parts which are the same as those corresponding parts in FIG. 1 are designated by the same reference numerals. FIG. 3 shows a case where a microprocessor 10 is coupled to another circuit via a processor bus 13.

A RAM 11 which forms the memory includes the memory cell part (main buffer part) 1, the vacant address management table 2, the access controller (access control program) 3, and the vacant address searcher (VTBL search program) 4. An input/output (I/O) port 12 is coupled to the processor bus 13, and forms an interface with respect to an external apparatus which uses the memory.

In order to realize the various functions of the RAM 11 by the microprocessor 10, the vacant address management table 2 which is used to search for the vacant address is provided within the RAM 11 which is under control of the microprocessor 10. The operation of the memory is realized by a software which makes a reference to and updates the vacant address management table 2. The process carried out by the memory is the same as that shown in FIG. 2, even when the software is used to realize the various functions of the memory.

But recently, particularly in the field of communication, there are demands to realize extremely high processing speeds in apparatuses which employ techniques such as the Asynchronous Transfer Mode (ATM) switching technique and the optical transmission technique. In a case where the data to be stored in the above described memory us a channel system data, it is necessary to realize a processing speed greater than or equal to a throughput of the line. For example, in a OC-3c interface which is a Synchronous Optical NETwork (SONET) line, the throughput is 155.53 Mbps, and thus, it is becoming impossible to carry out a software processing by the microprocessor 10 unless a parallel processing is made with 32 bits, 64 bits or a larger number of bits. However, it is undesirable to increase the number of bits that are processed in parallel, since it would increase the hardware scale of the apparatus.

When considering constructing the memory purely by hardware in view of the above, a method of searching the vacant address in the vacant address management table 2 becomes a problem.

FIG. 4 is a system block diagram showing the construction of the conventional vacant address searcher 4. The vacant address searcher 4 shown in FIG. 4 includes an address generating counter (SCNT) 20 is capable of generating addresses to specify the entire vacant address management table 2, and a controller which reads and writes with respect to the vacant address management table 2 based on an output of the counter 20. The counter 20 is started by an external trigger, and generates the address starting from a least significant address towards a most significant address or vice versa. Of course, the counter 20 may generate the address starting from an intermediate address. An address selector 21 selects an external address ACADR or the output address of the counter 20 depending on an output of a selector controller 22, and supplies the selected address to the vacant address management table 2.

The controller reads the vacant address management table 2 based on the output address of the counter 20, and the counter 20 stops the count when the vacant address is read from the vacant address management table 2. A vacancy detector 23 detects the vacant address, and stores the vacant address in a vacant address storage 24. The vacant address storage 24 outputs the vacant address VADR stored therein. A write data creating part 25 creates a write data which indicates whether or not the address is vacant, and supplies the write data to the vacant address management table 2. A read/write controller 26 controls the read and write with respect to the vacant address management table 2.

FIG. 5 is a timing chart for explaining the operation of the conventional vacant address searcher 4 shown in FIG. 4. FIG. 5(a) shows a count start signal CNTST, FIG. 5(b) shows an output address CADR of the counter 20, FIG. 5(c) shows an output address SADR of the address selector 21, FIG. 5(d) shows an output RFLG of the vacant address management table 2, FIG. 5(e) shows an output VDET of the vacancy detector 23 indicating whether or not the address is vacant, and FIG. 5(f) shows an output address VADR of the vacant address searcher 4 obtained from the vacant address storage 24.

When the count start signal CNTST is generated, the address selector 21 selects the output address CADR of the counter 20. When the output address CADR of the counter 20 is successively updated from 0, a reference is made to the contents at the corresponding addresses of the vacant address management table 2. In this state, the addresses 0 through 2 are in use. When the output address CADR of the counter 20 becomes 3, the corresponding address and subsequent addresses of the vacant address management table 2 indicate vacancy. The output VDET of the vacancy detector 23 indicating whether or not the address is vacant is supplied to the vacant address storage 24, and the output vacant address VADR from the vacant address storage 24 is supplied to the access controller 3.

Actually, the vacant addresses are searched successively, and for this reason, it takes time to find the vacant address as the number of vacant addresses becomes small. The time required to find the vacant address becomes larger as the size of the vacant address management table 2 becomes larger. As a result, the original purpose of realizing the memory purely by hardware, that is, to improve the processing speed which cannot be greatly improved from the software approach, cannot be achieved in a satisfactory manner. In other words, it is difficult to bring out the advantageous effects of realizing the memory purely by hardware.

SUMMARY OF THE INVENTION

Accordingly, it is a general object of the present invention to provide a novel and useful memory vacancy management apparatus and line interface unit, in which the problems described above are eliminated.

Another and more specific object of the present invention is to provide a memory vacancy management apparatus and line interface unit, which can positively find a vacant address at a high speed.

Still another object of the present invention is to provide a memory vacancy management apparatus for managing vacant addresses of a memory which is capable of storing various information, comprising a vacant address management table having a number of addresses identical to a number of addresses of the memory, and storing vacancy information indicating whether or not the addresses of the memory are vacant, wherein the vacancy information with respect to an address of the memory having an arbitrary address value is stored at an address of the vacant address management table having the same arbitrary address value. According to the memory vacancy management apparatus of the present invention, it is possible to recognize a vacant region of the memory and to positively find the vacant address at a high speed.

A further object of the present invention is to provide a line interface unit for exchanging ATM cells between up and down lines and an ATM switch in an ATM switching system, comprising OAM cell creating means for creating an OAM cell for one of the up and down lines responsive to a detection of an OAM cell from the other of the up and down lines or responsive to an external request, a memory storing an OAM cell data queue of created OAM cells which is shared by a plurality of lines, a shared buffer management table managing a sending sequence of the OAM cell data stored in the memory for each line, and OAM cell inserting means for inserting the created OAM cell on the one of the up and down lines responsive to a detection of an idle cell on the one of the up and down lines, by making a reference to the shared buffer management table, where the shared buffer management table has a number of addresses identical to a number of addresses of the memory and stores vacancy information indicating whether or not the addresses of the memory are vacant, and the vacancy information with respect to an address of the memory having an arbitrary address value is stored at an address of the shared buffer management table having the same arbitrary address value. According to the line interface unit of the present invention, it is possible to recognize a vacant region of the memory and to positively find the vacant address at a high speed, so that the processing speed of the line interface unit can be improved.

Other objects and further features of the present invention will be apparent from the following detailed description when read in conjunction with the accompanying drawings.

BRIEF DESCRIPTION OF THE INVENTION

DESCRIPTION OF THE PREFERRED EMBODIMENTS

Figure 1:
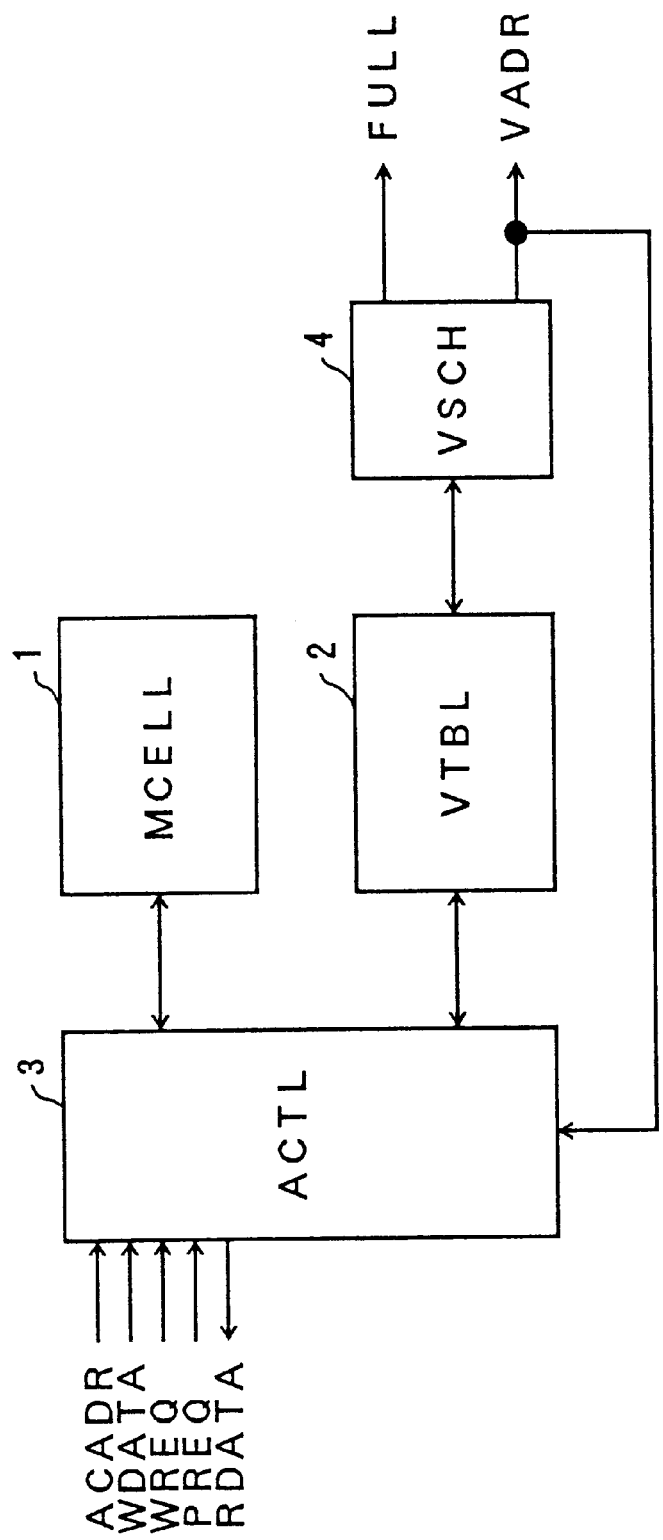
FIG. 1 is a system block diagram showing an example of a conventional memory having the vacant address searching function.
Figure 2:
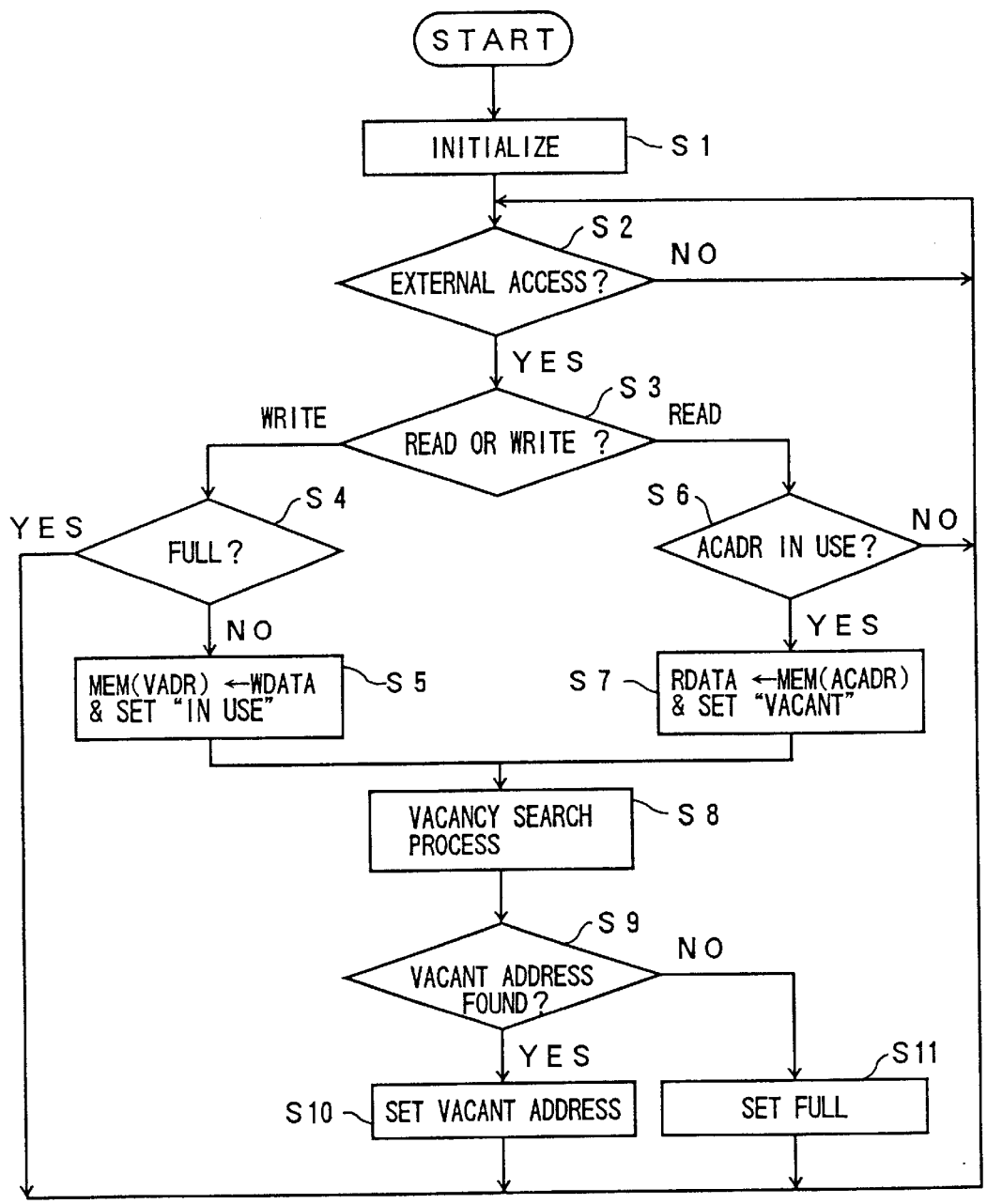
FIG. 2 is a flow chart for explaining the operation of the conventional memory shown in FIG. 1.
Figure 3:
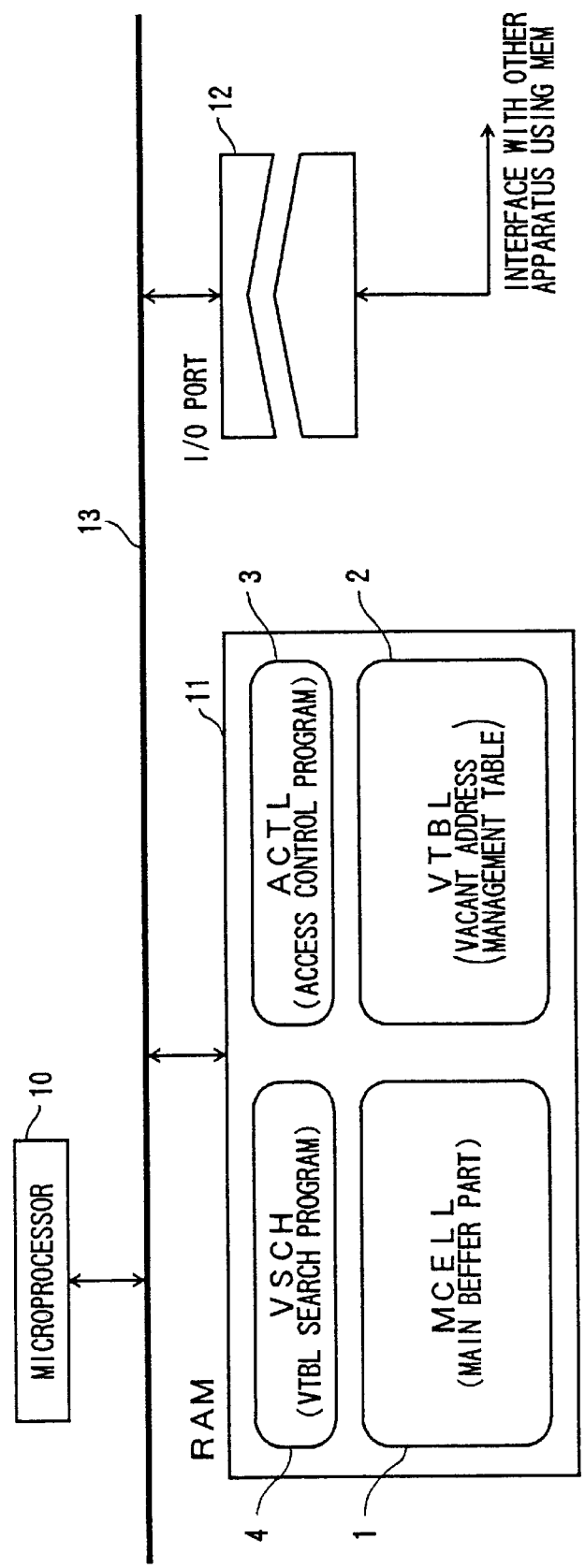
FIG. 3 is a diagram showing the construction of the memory using a microprocessor.
Figure 4:
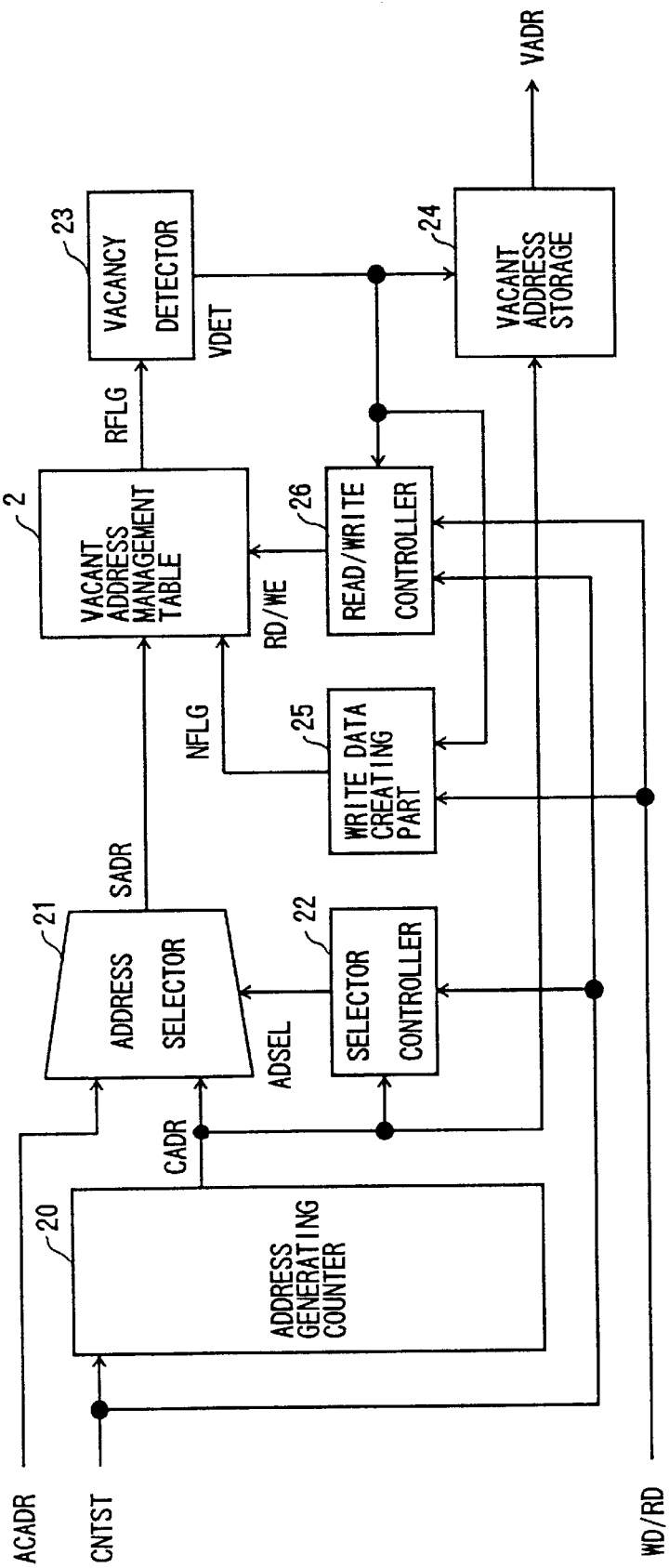
FIG. 4 is a system block diagram showing the construction of a conventional vacant address searcher.
Figure 5:
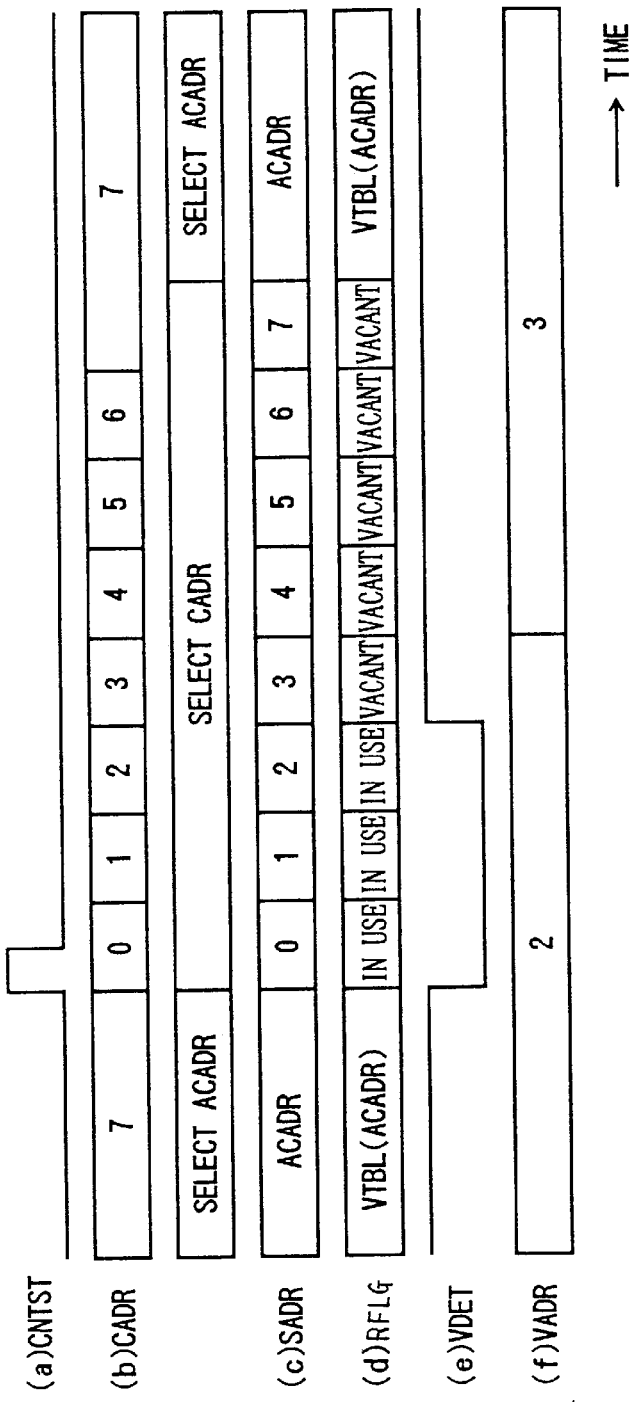
FIG. 5 is a timing chart for explaining the operation of the conventional vacant address searcher shown in FIG. 4.
Figure 6:
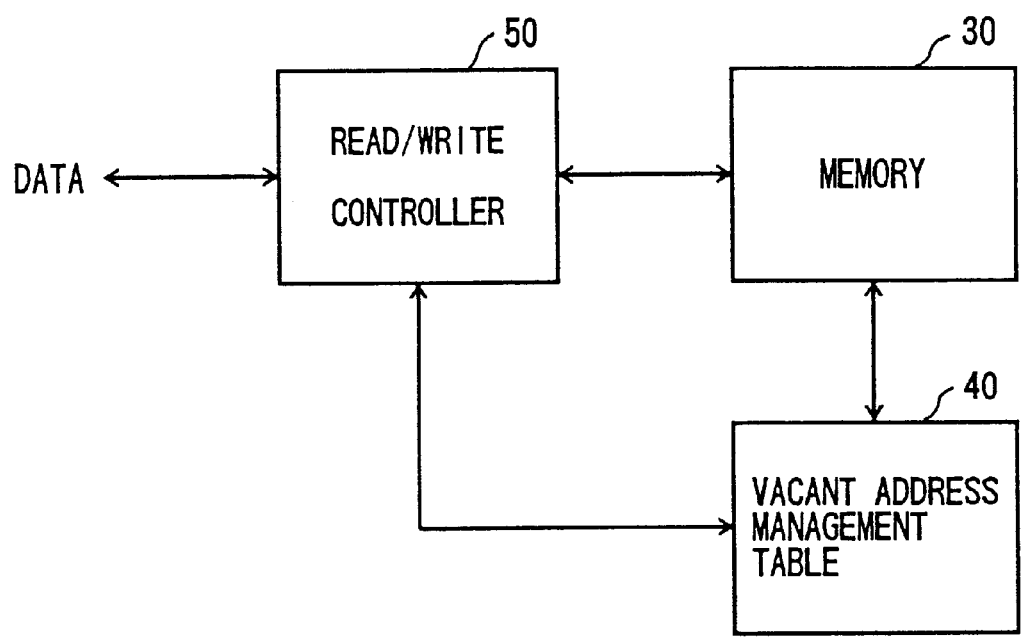
FIG. 6 is a system block diagram for explaining the operating principle of the present invention.

First, a description will be given of the operating principle of the present invention, by referring to FIG. 6. FIG. 6 is a system block diagram for explaining the operating principle of the present invention.

In FIG. 6, a memory 30 stores data in units of addresses. A vacant address management table 40 has the same number of addresses as the memory 30, and stores information indicating whether the addresses of the memory 30 are vacant or in use. A read/write controller 50 receives vacant address information from the vacant address management table 40, and writes data at a memory location of the memory 30 indicated by the vacant address. In addition, the read/write controller 50 reads data from a specific address of the memory 30.

The information indicating whether the address of the memory 30 is vacant or in use, is stored in the vacant address management table 40 in a region having the same address value as the corresponding address of the memory 30. Hence, it is possible to recognize the vacant region of the memory 30 and to positively find the vacant address at a high speed.

When searching the vacant address by making a reference to the vacant address management able 40, it is possible to make the reference to the contents of the vacant address management table 40 in one operation. In this case, it is possible to realize a high-speed operation by simultaneously making the reference to all of the contents of the vacant address management table 40.

In addition, if a plurality of vacant addresses exist when the reference is made to the vacant address management table 40, it is possible to obtain the vacant address starting from the address having the smallest address value. In this case, it is possible to successively write the data in the memory 30 starting from the address having the smallest address value.

Furthermore, if a plurality of vacant addresses exist when the reference is made to the vacant address management table 40, it is possible to simultaneously obtain a number of vacant addresses within a predetermined number range.

Figure 7:
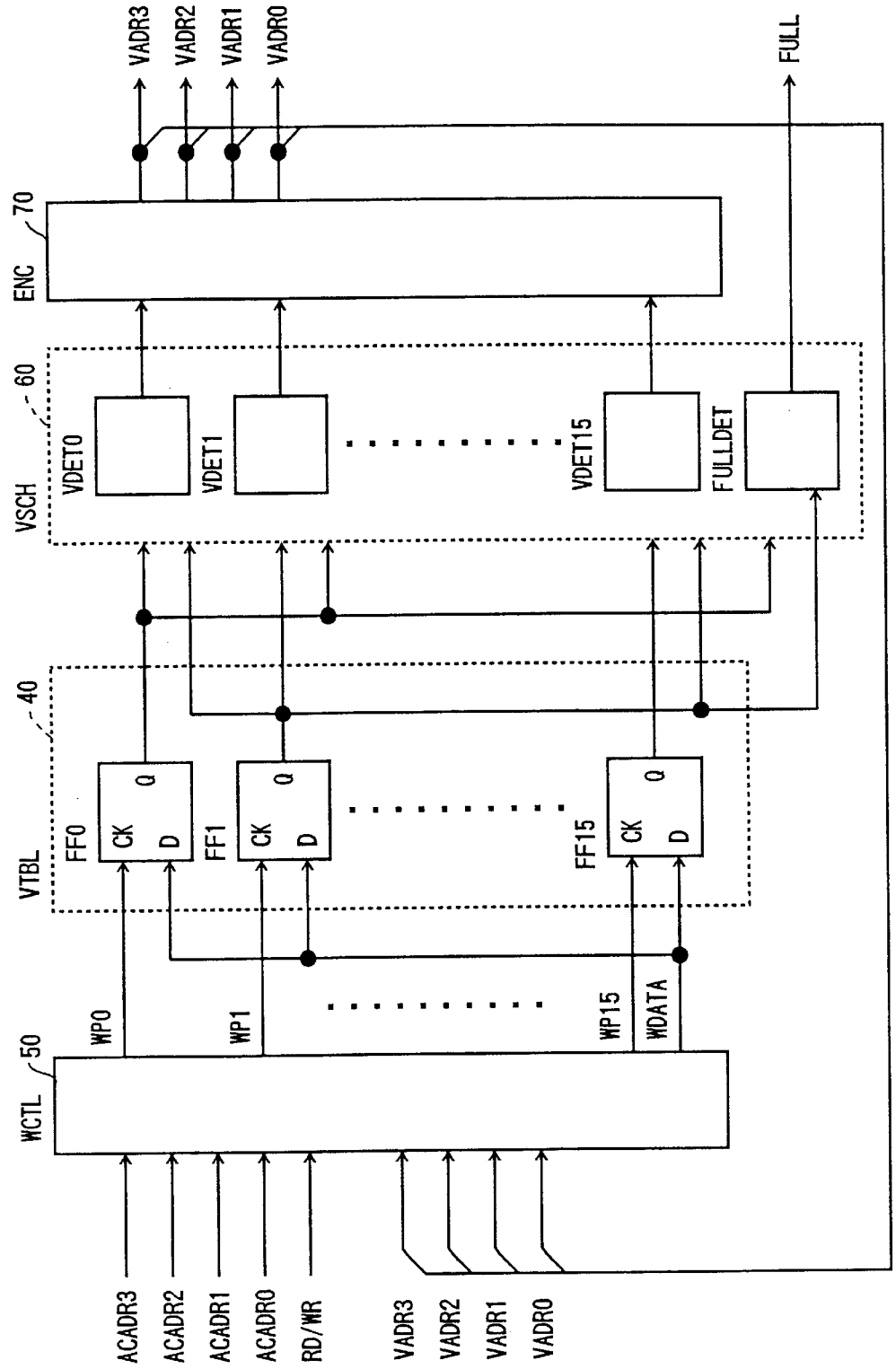
FIG. 7 is a system block diagram showing a first embodiment of a memory vacancy management apparatus according to the present invention.

Next, a description will be given of a first embodiment of a memory vacancy management apparatus according to the present invention, by referring to FIG. 7. FIG. 7 is a system block diagram showing the first embodiment of the memory vacancy management apparatus. In FIG. 7, those parts which are the same as those corresponding parts in FIG. 6 are designated by the same reference numerals, and illustration of the memory 30 which actually stores the data is omitted.

For the sake of convenience, it is assumed that the memory has 16 addresses. Hence, the capacity of the vacant address management table (VTBL) 40 is also naturally 16 addresses. In addition, it is assumed for the sake of convenience that storage information of each address of the vacant address management table 40 is "0" to indicate "vacant" and "1" to indicate "in use", but it is of course possible to indicate "vacant" by "1" and to indicate "in use" by "0".

The vacant address management table 40 is made up of 16 flip-flops FF0 through FF15. Each of the flip-flops FF0 through FF15 corresponds 1:1 to one of the 16 addresses, and stores the state of use of the corresponding address of the memory. The read/write controller (access controller) 50 controls the access with respect to the vacant address management table 40. When making a write access, the access controller 50 decodes vacant address information received from a vacant address searcher (VSCH) 60, and generates a write pulse corresponding to an accessing address. The vacant address searcher 60 detects a vacant address based on the information stored in the vacant address management table 40. The vacant address information is a 4-bit information indicating one of "0" to "15", and the generated write pulse is one of WP0 to WP15. For example, a rising edge of a write/read signal RD/WE may be used as a trigger for generating a write pulse WPi, where i=0, 1, . . . , 15).

The write pulses WP0 through WP15 from the access controller 50 are input to clock input terminal CK of the corresponding flip-flops FF0 through FF15 of the vacant address management table 40. In addition, bits of the write data WDATA are input to data input terminal D of the corresponding flip-flops FF0 through FF15. Each flip-flop FFi reads and stores the signal input to the data input terminal D thereof when the corresponding write pulse WPi is input to the clock input terminal CK thereof.

For example, suppose that the address "3" is presently "vacant", and a write access is made to the vacant address management table 40 in order to change the state of the address "3" to "in use" due to the writing of the data at the address "3" of the memory. In this case, the write pulse WP3 is generated as a result of decoding the address "3", and the bit "1" of the write data WDATA indicating "in use" is input to the data input terminal D of the flip-flop FF3. Hence, the bit "1" of the write data WDATA is stored in the flip-flop FF3.

On the other hand, suppose that the address "3" is presently "in use", and a read access is made to change the state of the address "3" to "vacant" due to the reading of the data from the address "3" of the memory. In this case, when a write access is made to the vacant address management table 40 after the address "3" becomes "vacant" again, the bit "0" of the write data WDATA indicating "vacant" is input to the data input terminal D of the flip-flop FF3. Hence, the bit "0" of the write data WDATA is stored in the flip-flop FF3.

Figure 8:
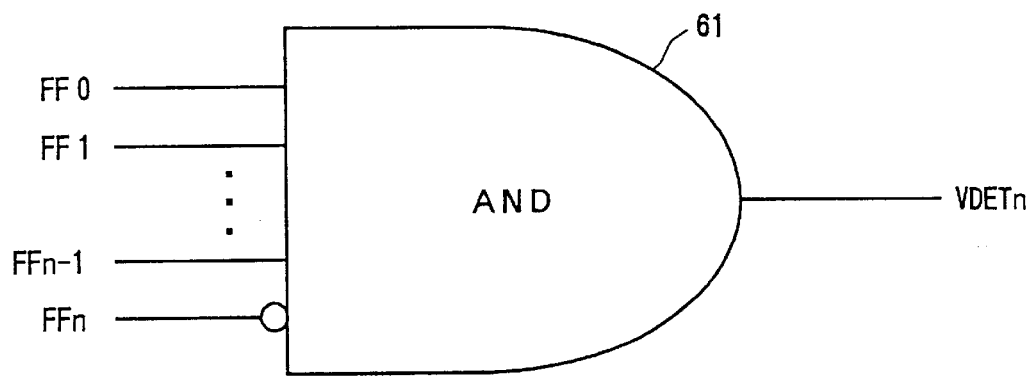
FIG. 8 is a diagram for explaining the operating principle of an address searcher.

FIG. 8 is a diagram for explaining the operating principle of the vacant address searcher 60. The vacant address searcher 60 is made up of a (n+1)-input AND circuit 61, where n=0, 1, . . . , 15. Actually, 16 AND gates AND0 through AND15 are provided within the vacant address searcher 60, that is, the AND circuit 61. Each AND gate ANDn has n+1 inputs, with only the nth input from the flip-flop FFn being inverted. As a result, the AND gate ANDn outputs a signal VDETn which is "1" only when all of the addresses "0" through "n−1" are "in use" and the address "n" is "vacant".

Therefore, at an arbitrary time, at least one of the AND gates AND0 through AND15 outputs the signal VDET which is "1" to indicate "vacant", and the "vacant" address having the smallest address value of the vacant addresses at this arbitrary time is output from the AND circuit 61. Of course, if the vacant address management table 40 indicates that there is absolutely no vacancy, the AND gates AND0 through AND15 outputs the signals VDET0 through VDET15 which are all "0".

By using the vacant address searcher 60, it is unnecessary to trigger a process of searching for a vacant address. Instead, the vacant address searcher 60 can find and indicate the vacant address in real-time, based on each address and the state of each address at a given time.

According to this embodiment, the vacant address searcher 60 can simultaneously make a reference to all of the contents of the vacant address management table 40 in one operation, thereby making it possible to carry out a high-speed process.

In addition, by indicating the vacant address having the smallest address value when a plurality of vacant addresses exist, it becomes possible to successively write the data starting from the vacant address having the smallest address value.

Figure 9:
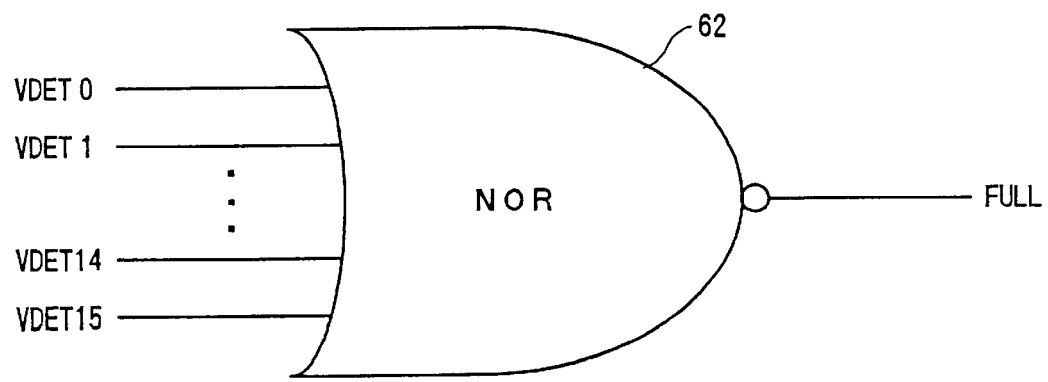
FIG. 9 is a diagram for explaining the operating principle of a full state detector.

FIG. 9 is a diagram for explaining the operating principle of a full state detector within the vacant address searcher 60. A signal FULL which indicates that the memory is full is output from the vacant address searcher 60 when all of the contents of the vacant address management table 40 indicates "in use". A 16-input NOR circuit 62 shown in FIG. 9 receives the output signals VDET0 through VDET15 of the AND circuit 61, and outputs the signal FULL having the value "1" when all of the signals VDET0 through VDET15 indicate "in use".

The signals VDET0 through VDET15 output from the AND gates AND0 through AND15 of the vacant address searcher 60 are input to an encoder 70 shown in FIG. 7. This encoder 70 converts the n of the AND gate ANDn which outputs the signal VDETn which is "1" into a binary number, so as to output a 4-bit signal made up of bits VADR3 through VADR0. This encoder 70 can be constructed by a general encoder circuit. The output signal bits VADR0 through VADR3 of the encoder 70 are input to the access controller 50, and are used as the write address when making a write access to the memory.

Accordingly, the time required to search the vacant address management table 40 is determined by the vacant address searcher 60 and the encoder 70. In other words, the required search time only corresponds to a delay time of the AND gates ANDn forming the vacant address searcher 60 and a delay time of a gate group forming the encoder 70. Normally, the encoder 70 is made up solely from a combination circuit which does not include a flip-flop. For this reason, if the delay time at each gate is sufficiently small and the contents of the flip-flop FFn within the vacant address management table 40 is updated in response to a clock pulse at an arbitrary time, it is possible to indicate a new vacant address by the output signal bits VADR3 through VADR0 of the encoder 70 by the time the next clock pulse is input.

Moreover, since the vacant address search operation is independent of the state of the vacant address management table 40, it is extremely convenient when it is necessary to search the vacant address at a high speed. In addition, the propagation delay time of a simple gate has become extremely short due to the recent improvements in the LSI element technology, and this embodiment is thus suited for realization using the LSI technology.

Figure 10:
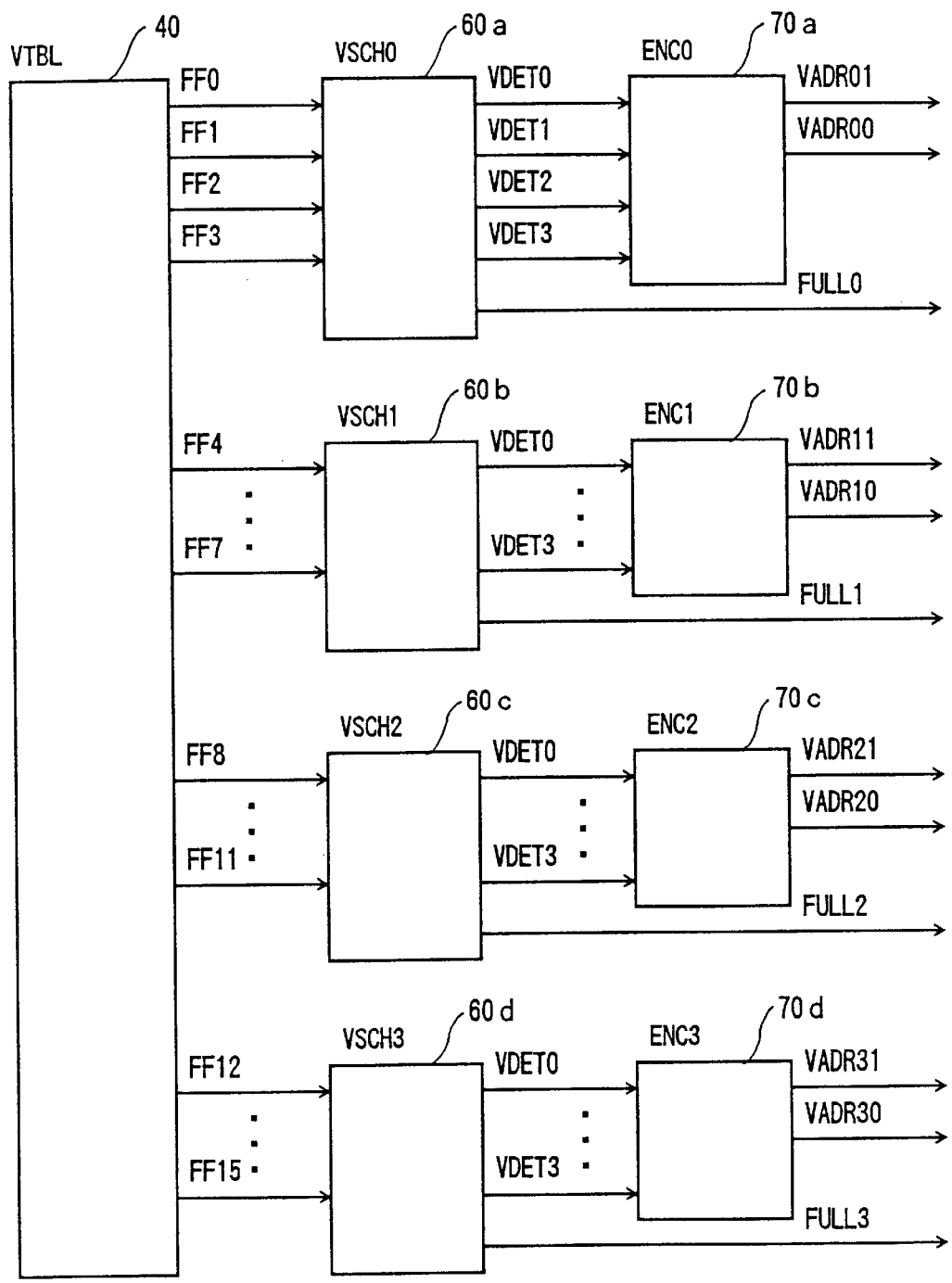
FIG. 10 is a system block diagram showing a second embodiment of the memory vacancy management apparatus according to the present invention.

Next, a description will be given of a second embodiment of the memory vacancy management apparatus according to the present invention, by referring to FIG. 10. FIG. 10 is a system block diagram showing the second embodiment of the memory vacancy management apparatus. In FIG. 10, those parts which are the same as those corresponding parts in FIG. 7 are designated by the same reference numerals, and a description thereof will be omitted.

In this second embodiment, the 16 addresses are divided into 4 address blocks each having 4 addresses. The circuits are designed similarly to the circuits of the first embodiment described above in conjunction with FIGS. 7 through 9, but with respect to each address block, so that it is possible to search a plurality of vacant addresses at the same time. As a result, this embodiment can cope with an application where buffering of a plurality of data is necessary.

In FIG. 10, the output of the vacant address management table 40 is input to each of vacant address searchers 60a through 60d in groups of 4 addresses. The vacant address is detected at each of the vacant address searchers 60a through 60d with respect to the corresponding address group which is made up of 4 addresses, and resulting output signals VDET0 through VDET3 are input to a corresponding one of encoders 70a through 70d. Each of the encoders 70a through 70d encodes the output signals VDET0 through VDET3 of the corresponding one of the vacant address searchers 60a through 60d into a 2-bit data. Therefore, 4 2-bit data respectively made up of bits VADR01 and VADR00, VADR11 and VADR10, VADR21 and VADR20, and VADR31 and VADE30 and indicating the vacant addresses within the 4 address groups of 4 addresses are output from the encoders 70a through 70d, and the signals FULL0 through FULL3 are output from the vacant address searchers 60a through 60d.

According to this second embodiment, it is possible to simultaneously indicate a plurality of vacant addresses. In addition, it is possible to simultaneously obtain a number of vacant addresses within a predetermined number range.

Figure 11:
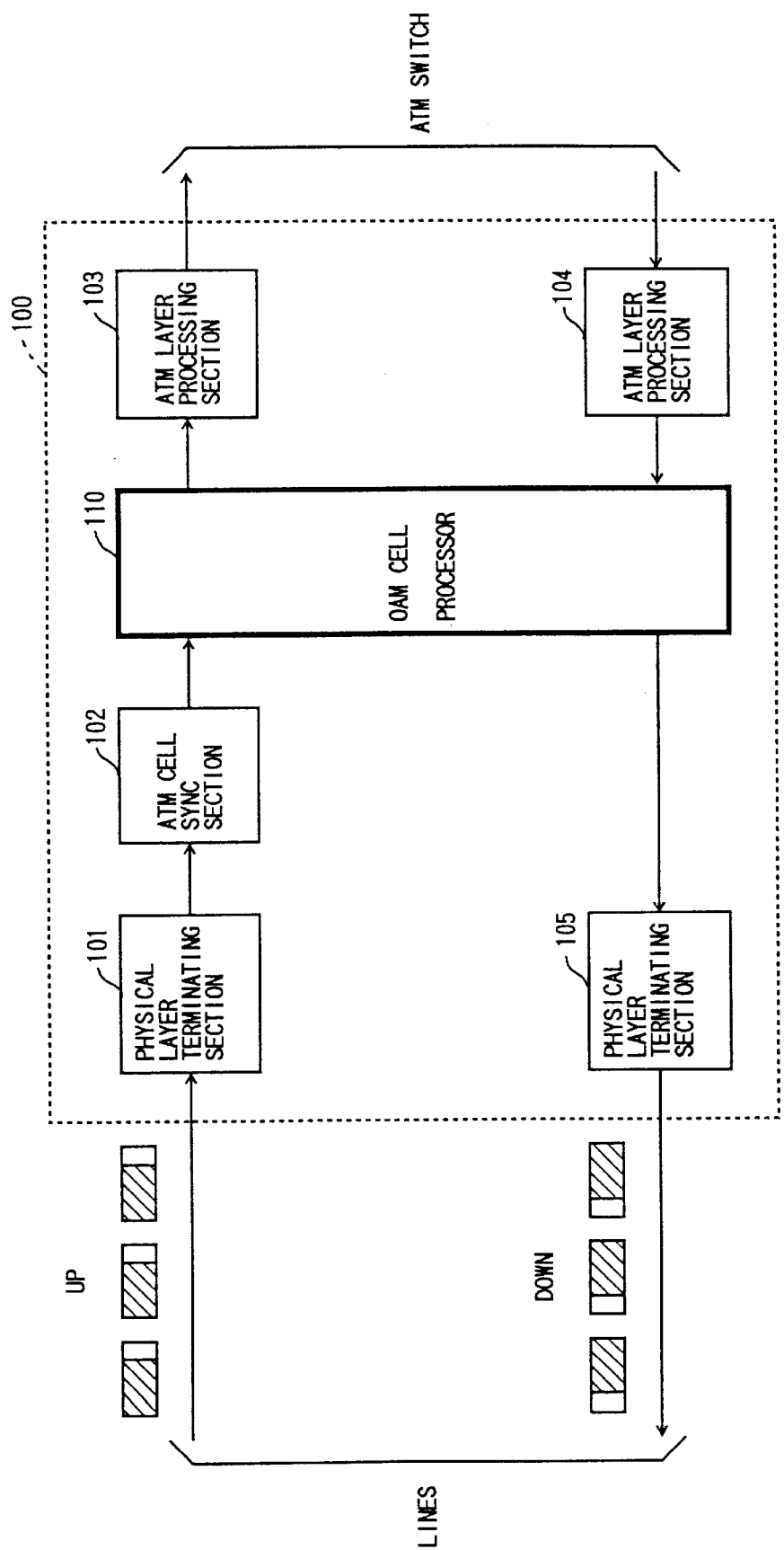
FIG. 11 is a system block diagram showing an embodiment of a line interface unit according to the present invention.
Figure 12:
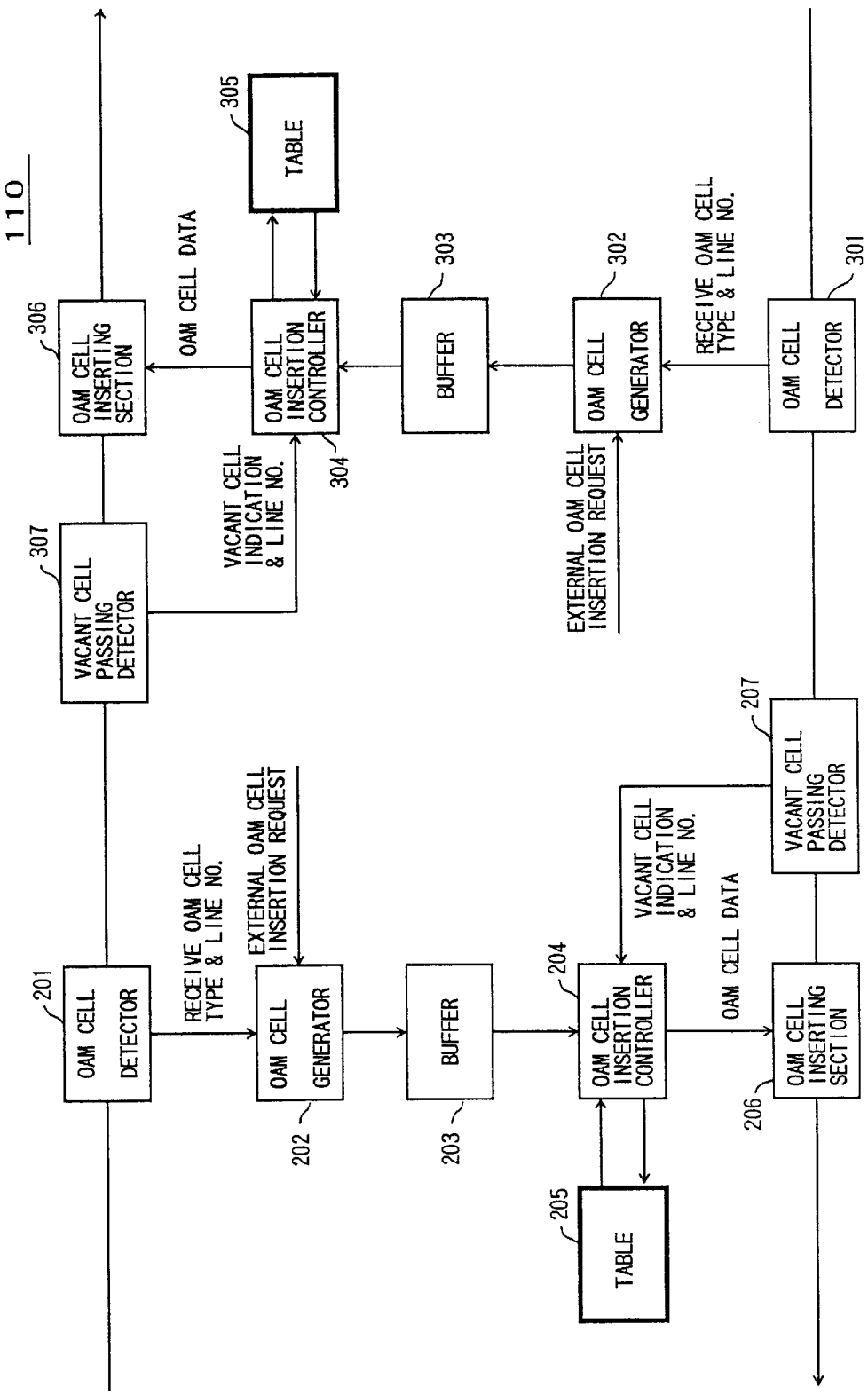
FIG. 12 is a system block diagram showing an embodiment of an operation and maintenance cell processor.

Next, a description will be given of an embodiment of a line interface unit according to the present invention, by referring to FIGS. 11 and 12. FIG. 11 is a system block diagram showing this embodiment of the line interface unit, and FIG. 12 is a system block diagram showing an embodiment of an operation and maintenance cell processor shown in FIG. 11.

A line interface unit 100 shown in FIG. 11 is used in an ATM switching system, and is coupled between a line (not shown) and an ATM switch (not shown). The line interface unit 100 includes receiving physical layer terminating section 101, an ATM cell synchronizing section 102, a receiving ATM layer processing section 103, a transmitting ATM layer processing section 104, a transmitting physical layer terminating section 105, and an Operation And Maintenance (OAM) cell processor 110 which are coupled as shown in FIG. 11.

In this embodiment, the line interface unit 100 forms a cell relay interface, and exchanges ATM cells between the line and the ATM switch. Three kinds of ATM cells are exchanged, namely, user cells, OAM cells and idle cells. The OAM cell is transferred through the same transmission path as the user cell, but the OAM cell is a special cell which is used for performance monitoring of the ATM layer (ATM connection). The OAM cell processor 110 processes and exchanges the OAM cell.

The idle cell indicates a time in which no user cell nor OAM cell exists. A user cell or an OAM cell can be newly written over a region of the idle cell. As will be described later in conjunction with FIG. 12, an OAM cell inserting section of the OAM cell processor 110 outputs the OAM cell which is to be inserted in the region of the idle cell.

This embodiment of the line interface unit is characterized by the construction of the OAM cell processor 110, and a known construction may be used for the basic construction shown in FIG. 11.

The OAM cell processor 110 shown in FIG. 12 includes up OAM cell detector 201, an OAM cell generator 202, an OAM cell data queue buffer 203, an OAM cell insertion controller 204, a shared buffer management table 205, a down OAM cell inserting section 206, a down idle cell passing detector 207, a down OAM cell detector 301, an OAM cell generator 302, an OAM cell data queue buffer 303, an OAM cell insertion controller 304, a shared buffer management table 305, an up OAM cell inserting section 306, and an up idle cell passing detector 307 which are coupled as shown. The system configuration provided with respect to the up direction and the system configuration provided with respect to the down direction are the same, because the OAM cell must be inserted in both the up direction and the down direction.

Again, a known construction may be used for the basic construction shown in FIG. 12. This embodiment is characterized by the construction of the shared buffer management tables 205 and 305 in particular. The vacant address management tables 40 of the first and second embodiments of the memory vacancy management apparatus described above may be applied to the shared buffer management tables 205 and 305, using the OAM cell data queue buffers 203 and 303 as the memories.

The OAM cell is created for each line number at one of the following timings (i) and (ii). This OAM cell creating timing is not the insertion timing of the OAM cell.

(i) When the OAM cell detector 201 or 301 receives and detects an OAM cell, an OAM cell to be inserted in the opposite direction is created correspondingly to the detected OAM cell. In other words, the OAM cell to be inserted in the down direction is created when the up OAM cell detector 201 detects the OAM cell, and the OAM cell to be inserted in the up direction is created when the down OAM cell detector 301 detects the OAM cell.

(ii) The OAM cell is created in response to a request from outside the OAM cell processor 110.

The created OAM cell is not output to the line immediately, because the user cells and other OAM cells are being transferred on the line. The created OAM cell can only be inserted in the region of the idle cell where these user cells and other OAM cells do not exist. Accordingly, the created OAM cells are stored in the OAM cell data queue buffer 203 or 303 depending on the created sequence.

The process becomes simple if the OAM cell data queue buffer is provided for each line. However, the capacity of the OAM cell data queue buffer generally required per line is small on the average, and for this reason, a single OAM cell data queue buffer is shared by a plurality of lines so as to improve the buffer utilization efficiency. Consequently, it becomes necessary to independently manage the sending sequence for each line with respect to the OAM cell data which are stored in the OAM cell data queue buffer 203 or 303, and the shared buffer management table 205 or 305 is used for this purpose.

The created OAM cell is transmitted at a timing which is determined by an event that "an idle cell" arrived. Hence, each of the idle cell passing detectors 207 and 307 monitors the passing of the idle cell, and when the passing of the idle cell is detected, requests the insertion of the OAM cell to the corresponding one of the OAM cell insertion controllers 204 and 304, together with the line number of the idle cell.

Responsive to the OAM cell insertion request, each of the OAM cell insertion controllers 204 and 304 obtains the line number which is notified with the OAM cell insertion request, and makes a reference to the corresponding one of the shared buffer management tables 205 and 306. When the OAM cell is queued with respect to the line having the same line number as the notified line number as a result of the reference made to the shared buffer management table 205 or 305, the OAM cell is output to this line.

Accordingly, the timing at which the OAM cell is inserted is dependent on the arrival timing of the idle cell and the line number of this idle cell. In other words, the OAM cell is not inserted in the created sequence. For this reason, the OAM cell data queues are stored at random addresses of the OAM cell data queue buffers 203 and 303, and it is necessary to dynamically manage the storage addresses of the OAM cell data queues when a new OAM cell creating request arrives. Therefore, it is particularly effective to apply the memory vacancy management apparatus of the present invention to the shared buffer management tables 205 and 305 of the line interface unit 110 as described above.

Further, the present invention is not limited to these embodiments, but various variations and modifications may be made without departing from the scope of the present invention.

What is claimed is:

1. A line interface unit for exchanging ATM cells between up and down lines and an ATM switch in an ATM switching system, comprising:

OAM cell creating means for creating an OAM cell for one of the up and down lines responsive to a detection of an OAM cell from the other of the up and down lines or responsive to an external request;

A memory storing an OAM cell data queue of created OAM cells which is shared by a plurality of lines;

A shared buffer management table managing a sending sequence of the OAM cell data stored in said memory for each line; and OAM cell inserting means for inserting the created OAM cell on said one of the up and down lines responsive to a detection of an idle cell on said one of the up and down lines, by making a reference to said shared buffer management table, said shared buffer management table having a number of addresses identical to a number of addresses of said memory, and storing vacancy information indicating whether or not the addresses of said memory are vacant, said vacancy information with respect to an address of said memory having an arbitrary address value being stored at an address of said shared buffer management table having the same arbitrary address value.

2. The line interface unit as claimed in claim 1, which further comprises:

a vacant address searcher simultaneously making a reference to all contents of said shared buffer management table in one operation when searching for a vacant address.

3. The line interface unit as claimed in claim 1, which further comprises:

a vacant address searcher searching a vacant address of the memory by making a reference to said shared buffer management table, said shared buffer management table outputting to said vacant address searcher a vacant address having a smallest address value if a plurality of vacant addresses exist in said memory.

4. The line interface unit as claimed in claim 1, which further comprises:

a vacant address searcher searching a vacant address of the memory by making a reference to said shared buffer management table, said shared buffer management table outputting to said vacant address searcher a number of vacant addressed within a predetermined number range if a plurality of vacant addresses exist in said memory.

5. The line interface unit as claimed in claim 1, which further comprises:

a vacant address searcher searching a vacant address of the memory by making a reference to said shared buffer management table; and an encoder encoding the vacant address searched by said vacant address searcher.

6. The line interface unit as claimed in claim 5, wherein said vacant address searcher and said encoder comprise simple gates.

7. A line interface unit for exchanging ATM cells between up and down lines and an ATM switch in an ATM switching system, comprising:

an OAM cell creating section to create an OAM cell for one of the up and down lines responsive to a detection of an OAM cell from the other of the up and down lines or responsive to an external request;

a memory to store an OAM cell data queue of created OAM cells which is shared by a plurality of lines;

a shared buffer management table to manage a sending sequence of the OAM cell data stored in said memory for each line; and an OAM cell inserting section to insert the created OAM cell on said one of the ups and down lines responsive to a detection of an idle cell on said one of the up and down lines, by making a reference to said shared buffer management table, said shared buffer management table having a number of addresses identical to a number of addresses of said memory, and storing vacancy information indicating whether or not the addresses of said memory are vacant, said vacancy information with respect to an address of said memory having an arbitrary address value, being stored at an address of said shared buffer management table having the same arbitrary address value.

* * * * *